(12) United States Patent
Shiraishi

(10) Patent No.: US 12,445,401 B2
(45) Date of Patent: Oct. 14, 2025

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Kenichi Shiraishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 17/985,362

(22) Filed: Nov. 11, 2022

(65) Prior Publication Data

US 2023/0155972 A1    May 18, 2023

(30) Foreign Application Priority Data

Nov. 15, 2021  (JP) ................................. 2021-185483

(51) Int. Cl.
*H04L 51/216*    (2022.01)
*H04L 51/56*    (2022.01)

(52) U.S. Cl.
CPC ............ *H04L 51/216* (2022.05); *H04L 51/56* (2022.05)

(58) Field of Classification Search
CPC .............................. H04L 51/216; H04L 51/56
See application file for complete search history.

(56) References Cited

U.S. PATENT DOCUMENTS

| | | | |
|---|---|---|---|
| 9,832,160 B2 | 11/2017 | Soga | |
| 11,533,286 B1* | 12/2022 | Clediere | G06F 3/04817 |
| 11,558,323 B1* | 1/2023 | Yamamoto | H04L 51/08 |
| 2006/0036685 A1* | 2/2006 | Canning | H04L 67/10 |
| | | | 709/204 |
| 2012/0191779 A1* | 7/2012 | Mandel | G06F 16/2228 |
| | | | 709/204 |
| 2014/0304345 A1 | 10/2014 | Soga | |
| 2018/0121395 A1* | 5/2018 | Bernstein | H04L 67/01 |
| 2018/0249014 A1* | 8/2018 | Karlsson | H04L 65/1069 |
| 2021/0150482 A1* | 5/2021 | Asadorian | H04L 51/216 |
| 2022/0385609 A1* | 12/2022 | Hassan | G06F 3/0482 |

FOREIGN PATENT DOCUMENTS

JP    2014-203325 A    10/2014
JP    2020-099017 A    6/2020

* cited by examiner

*Primary Examiner* — Ryan J Jakovac
(74) *Attorney, Agent, or Firm* — VENABLE LLP

(57) ABSTRACT

An information processing apparatus, which transmits a message to an information-sharing service managing messages on a thread format including a plurality of messages, obtains, in a case where a reply mode is set on the information processing apparatus by a user before a first message is transmitted to the information-sharing service with a scanned document, information on a plurality of threads from the information-sharing service, and extracts first threads relevant to the user from the obtained information on the plurality of threads. The extracted first threads are displayed, and the user specifies a thread from the displayed first threads as a first destination to which the first message is to be transmitted.

7 Claims, 12 Drawing Sheets

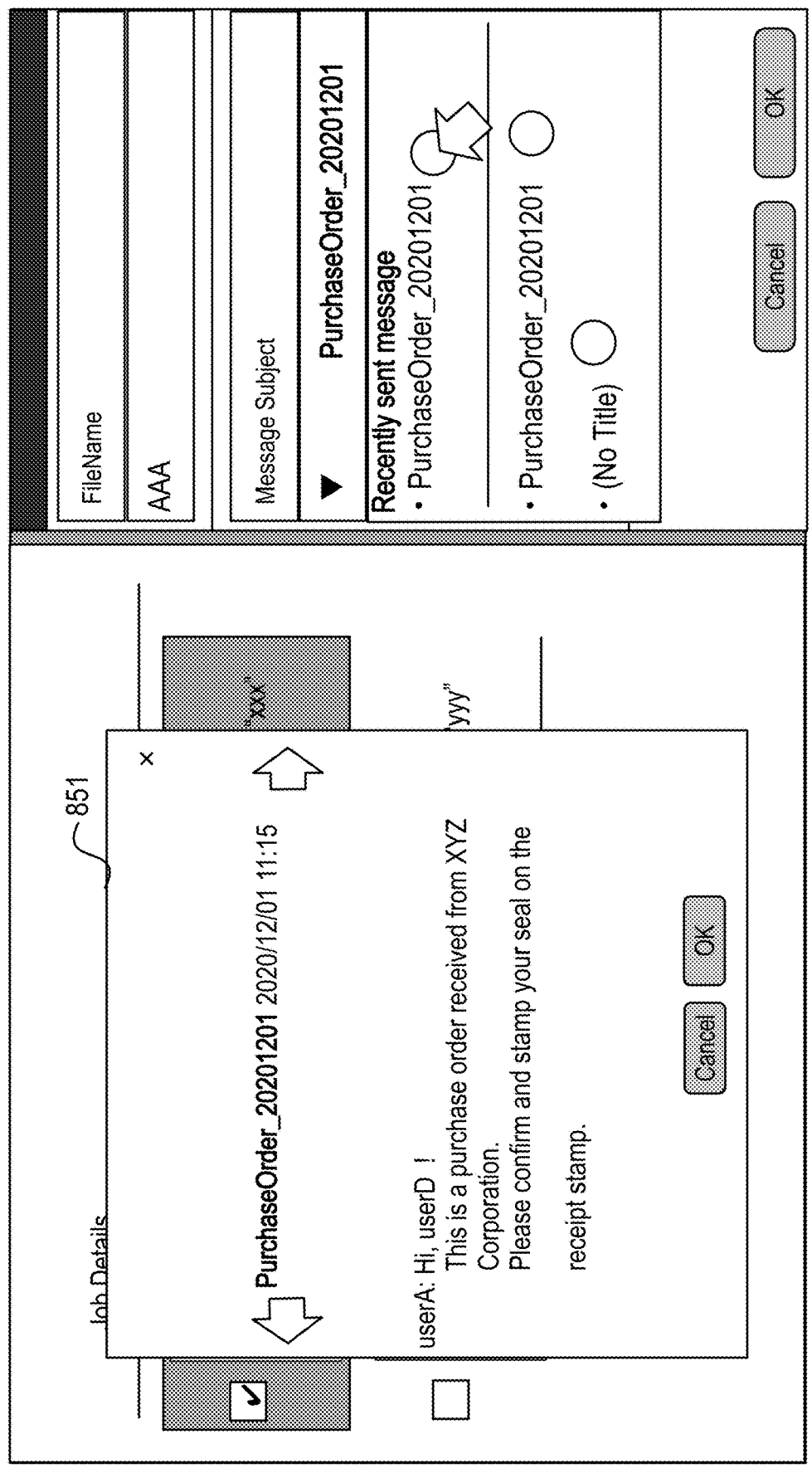

INFORMATION PROCESSING APPARATUS, METHOD OF CONTROLLING INFORMATION PROCESSING APPARATUS, AND STORAGE MEDIUM

BACKGROUND

Field

The present disclosure relates to an information processing apparatus for presenting information of candidate destinations to a user when the user determines a message as a destination, a method of controlling the information processing apparatus, and a storage medium.

Description of the Related Art

Conventionally, there is a document management system in which sheet documents are scanned and digitized, and metadata such as file names and where to store the documents are set for the digitized documents. It is also well-known that information-sharing sites such as SNS (Social Networking Service), which provides services for sharing messages and files between users, are used as storage locations for the digitized documents.

There could be a system in which the document management systems and information-sharing sites cooperate. The document management system uses an API (Application Programming Interface) published by the information-sharing service to allow the document management system to use information such as messages, files, the date and time of messages, and participating users, which is stored in the information-sharing site.

Japanese Patent Application Laid-Open No. 2020-99017 discloses transmitting scanned documents to social media. U.S. Patent Application Publication No. 2014/0304345 discloses that, if a user selects a desired comment ticket from among a plurality of comment tickets stored in a document management server in an image forming apparatus, the image forming apparatus transmits a scanned document to a destination SNS included in the selected comment ticket.

SUMMARY

According to an aspect of the present disclosure, an information processing apparatus transmitting a message to an information-sharing service managing messages on a thread format including a plurality of messages, the information processing apparatus comprises at least one memory that stores instructions, and at least one processor that executes the instructions to: obtain, in a case where a user transmits a first message as a reply to the messages on the thread format, information on a plurality of threads for a first destination group of the first message from the information-sharing service, extract first threads for the destination group from the information on the plurality of threads, the user participating in the first threads, and display the first threads as a first destination of the first message.

Further features of the present disclosure will become apparent from the following description of exemplary embodiments with reference to the attached drawings.

BRIEF DESCRIPTION OF THE DRAWINGS

FIG. 8B illustrates an example of the UI of the client application.

DESCRIPTION OF THE EMBODIMENTS

Hereafter, the configuration for carrying out the present disclosure is described using drawings.

It should be noted that the following embodiment does not limit the disclosure claimed, and not all combinations of features described in the embodiment are essential to the means of solving the disclosure.

First Embodiment

Figure 1:
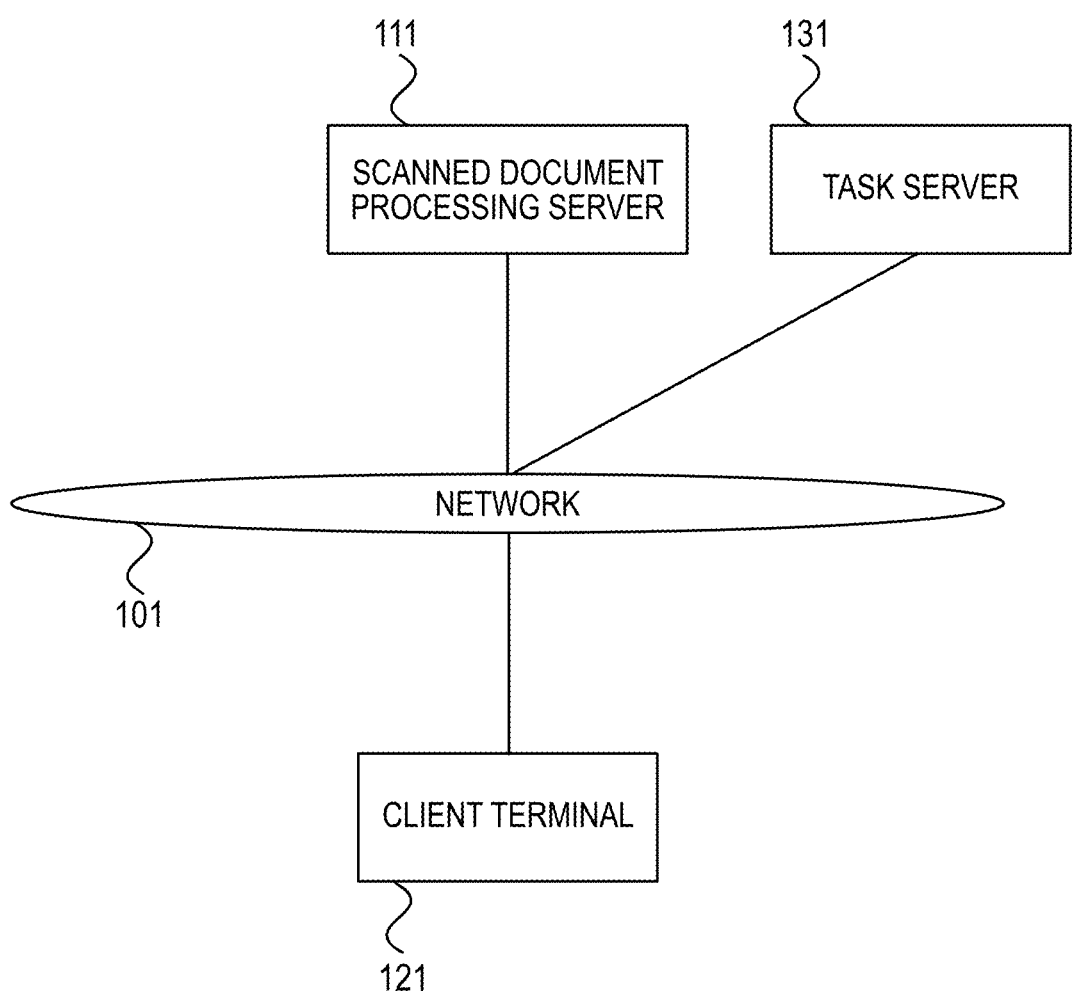
FIG. 1 illustrates a system configuration and a network configuration of the present embodiment.

FIG. 1 illustrates an example of system configuration and network configuration in the present embodiment. A network 101 may be a network such as an internet or an intranet. A scanned document processing server 111 is an information processing apparatus and performs predetermined processing on scanned document images to transmit information, process results, and the like to other servers, client terminals, and the like via the network 101. A task server 131 is a server that performs various task management. The task server 131 provides an information-sharing service in the present embodiment. A client terminal 121 may be a personal computer, a laptop computer, a tablet computer, a smartphone, or the like that obtains image data, transmits data to the scanned document processing server 111, receives information from the task server 131, and the like.

Figure 2:
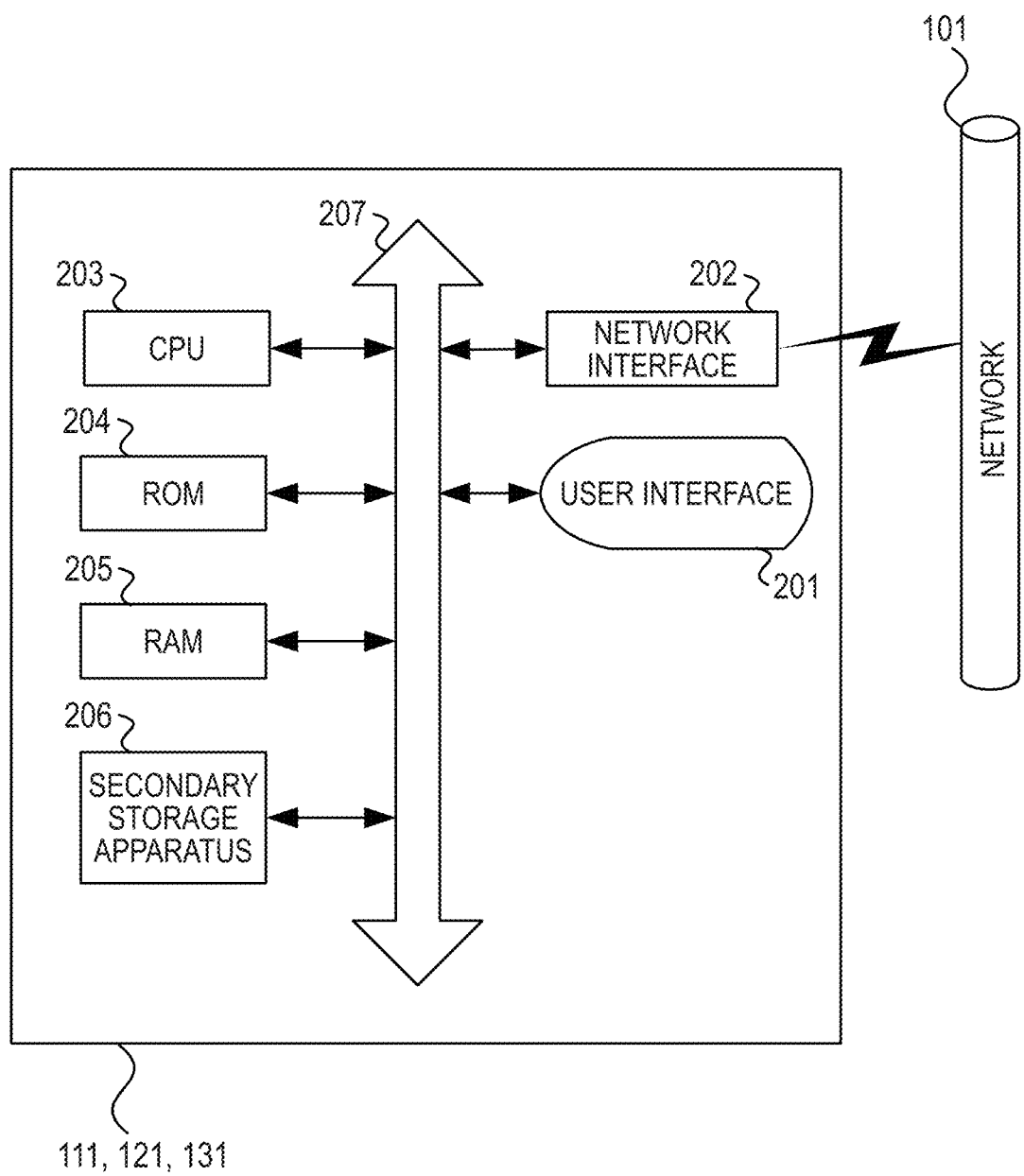
FIG. 2 illustrates a hardware configuration of a scanned document processing server, a client terminal, and a task server.

FIG. 2 illustrates the hardware configuration of the information processing functions of the scanned document processing server 111, the client terminal 121, and the task server 131, which are the information processing apparatus. A network interface 202 connects to the network 101 such as a LAN and communicates with other computers and network apparatuses. A communication method may be either wired or wireless. A CPU 203 executes programs read from a ROM 204, a RAM 205, a secondary storage apparatus 206, and the like, and integrally controls servers and client terminals. The ROM 204 stores embedded programs and data. The RAM 205 is a temporary memory area. The CPU 203 deploys and executes programs on the RAM 205 and also uses the RAM 205 as a work area. The secondary storage apparatus 206 is a non-volatile storage apparatus such as HDD and flash memory. A user interface 201 includes a display, keyboard, mouse, button, touch panel, and the like, which provides information to the user and controls input and output of signals such as information from the user. Computers without the above hardware can also be connected and operated by other computers through a method of remote desktop or remote shell. The components are connected to each other via a common bus 207.

Figure 3:
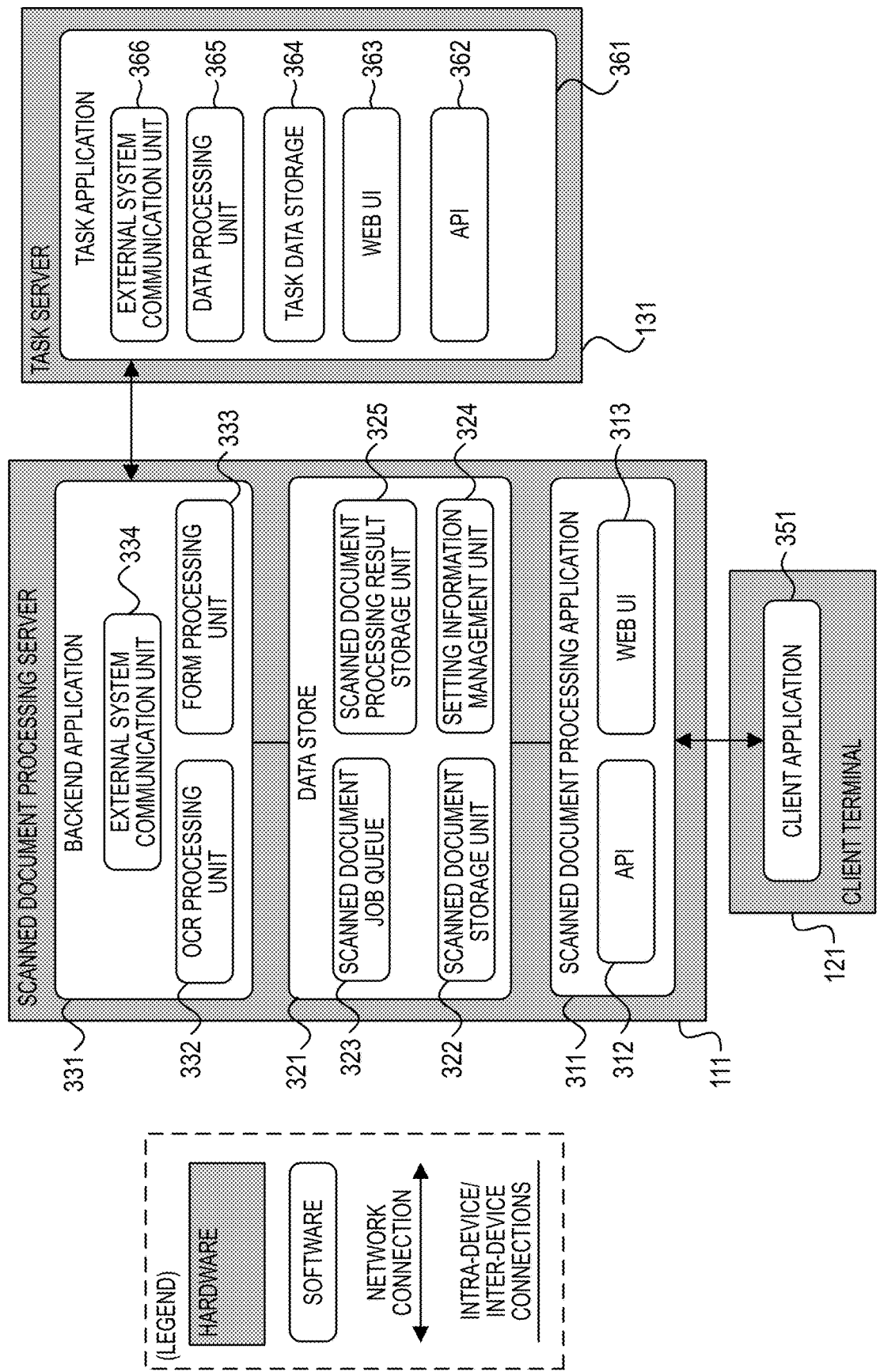
FIG. 3 illustrates software and hardware configurations of the system.

FIG. 3 illustrates the software and hardware configurations of the system. The software installed in each hardware runs on each CPU 203 and can communicate with each other via the network 101 (shown by arrows).

A scanned document processing application 311 is installed in the scanned document processing server 111. In the present embodiment, it is described that the scanned document processing server 111 is a web application server, but other implementations may be applied. An API (Application Programming Interface) 312 is a programming interface provided by the scanned document processing application 311. A web UI 313 is a user interface provided by the scanned document processing application 311.

A data store 321 holds and stores various data that are input from the scanned document processing application 311 and a backend application 331. A scanned document storage unit 322 stores the scanned document as image files such as JPEG or document files such as PDF (Portable Document Format). A scanned document job queue 323 stores queues for managing jobs waiting for setting information to be input. A setting information management unit 324 stores and manages setting information set during scanning, file names and destinations of scanned document images, account information required for cooperating with the task server 131, and setting items required for executing requests to the API of the task server 131 for each job. A scanned document processing result storage unit 325 stores OCR (Optical Character Recognition) processing results and form determination results.

The backend application 331 is responsible for the sequential execution of various processes in the background. An OCR processing unit 332 obtains input images from the scanned document storage unit 322 to execute the OCR. The OCR processing extracts coordinates of starting point, width, height, and strings recognized via the OCR of an area recognized as character strings. A form processing unit 333 determines a type of form based on the information such as the input image, the area pattern of the OCR processing result, and the strings recognized via the OCR. The determination processing can be any method such as pattern recognition machine learning and the like. An external system communication unit 334 transmits the scanned documents and the processing result of the scanned documents to the task server 131.

A client application 351 is a web application that works in cooperation with the scanned document processing application 311. The client application 351 may be provided by displaying the web UI 313 in a browser to transmit and receive the necessary data to and from the API 312 for executing the web application. The client application 351 is not limited to the web application, but may be a computer application or a smartphone application implemented to transmit and receive necessary data to and from the API 312.

A task application 361 is an application of information-sharing service executed on the task server 131. The task application 361 may comprise plural configurations such as a backend application, a data store, and a data processing application.

An API 362 and a web UI 363 are provided by the task application 361, respectively. A task data storage 364 stores data used by the task application 361. By using the messages and document information stored in the task data storage 364, a data processing unit 365 executes operation requests specified by the user. An external system communication unit 366 executes a process of responding to the transmission processing executed by the scanned document processing server 111.

The following description is discussed under assumption that the task application 361 includes an information-sharing service with a document management function and a messaging function between users, but the task application 361 may be any other task application. The system includes one or more task servers 131 to work with the scanned document processing server 111 for the purpose of transmitting, processing, and storing the processing results of the scanned document processing server 111.

Figure 4:
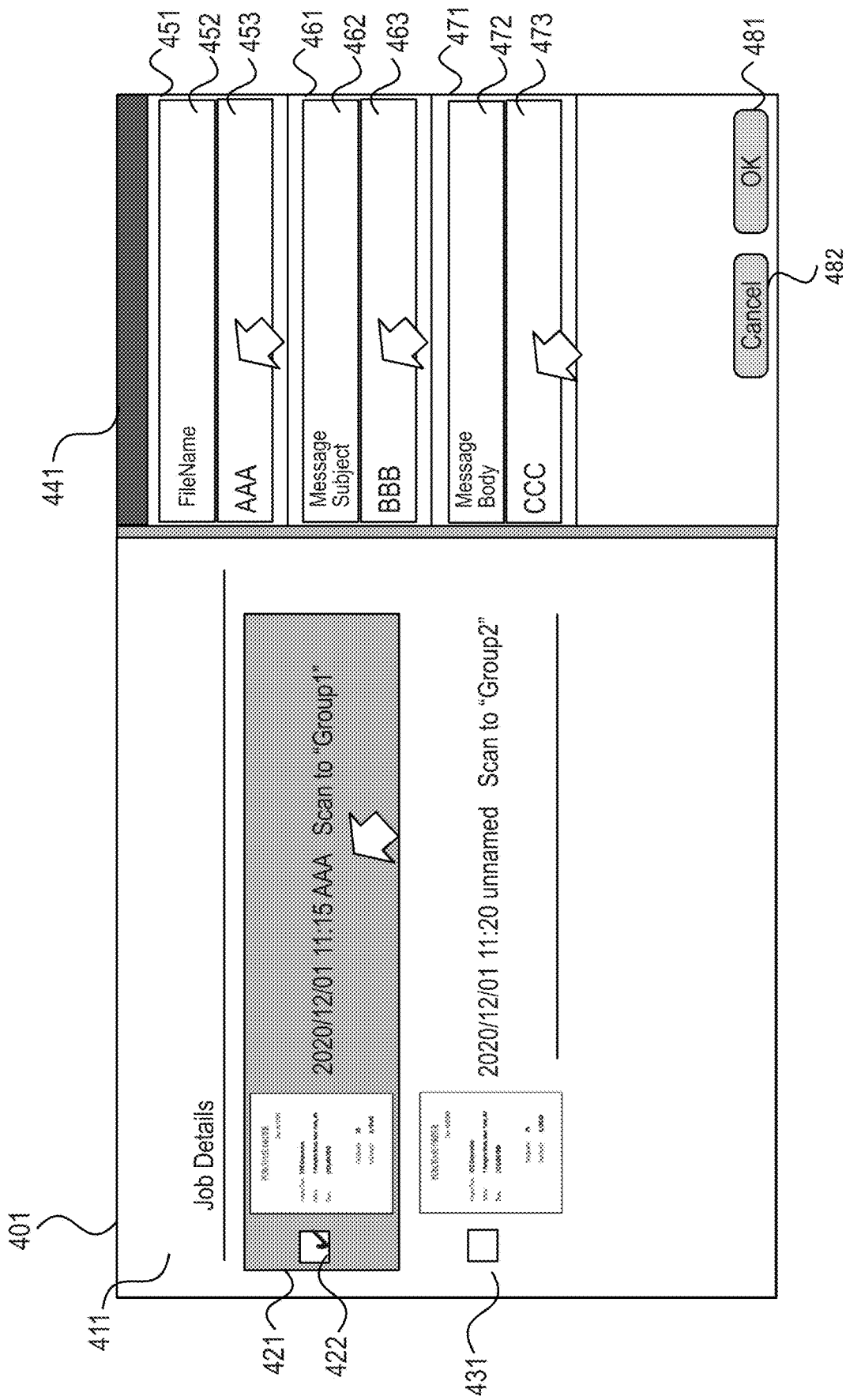
FIG. 4 illustrates a UI of a client application.

FIG. 4 illustrates a diagram showing the UI of the client application 351 to set setting information for a scanned document and instruct the scanned document processing server 111 to transmit the scanned document and the setting information to the task server 131. A UI 401 is displayed by the client application 351. The user can transmit a message with an attachment including a setting of the scanned document and the scanned document based on the setting to the task server 131 via the UI 401.

A preview pane 411 displays a list of jobs related to the scanned documents. The preview pane 411 displays scanned jobs 421 and 431 along with checkboxes, thumbnails of the scanned documents, scanned date and time, file names, destinations, and the like described below. The preview pane 411 also displays optional information about the scanned documents and contents set when the documents are scanned. In FIG. 4, the preview pane 411 displays a selected job 421 and an unselected job 431, respectively.

A checkbox 422 is used to switch a state of the job between a selected state and an unselected state. If the checkbox 422 is checked, the job is in the selected state. On the other hand, if the checkbox 422 is unchecked, the job is in the unselected state. A display for the selected or unselected status of the job may be indicated by changing the background color of the selected job. The selected or unselected status of the job may be changed by selecting the image displayed on the preview pane 411 or the area of the job on the preview pane 411, but the display means or selection means of the job may be replaced with any other means.

A setting information editing pane 441 displays a list of setting information associated with the selected job. The setting information editing pane 441 can be used to set a file name 451 for the scanned document, a subject 461 for a message to be transmitted to the task server 131, and message contents 471 for the message to be transmitted to the task server 131 as a setting item associated with the selected job 421. Only the setting items necessary for descriptions are shown here, but any other setting items may be added.

The setting information editing pane 441 displays setting item name fields 452, 462, and 472 and edit fields 453, 463, and 473 for each setting item. The edit field may be text fields, pulldowns, calendars, radio buttons, or any other editing method depending on the setting. The client application 351 reflects the edited value as the setting item value.

The user can instruct to save and transmit the setting by pressing an OK button 481 or a Cancel button 482.

Figure 5:
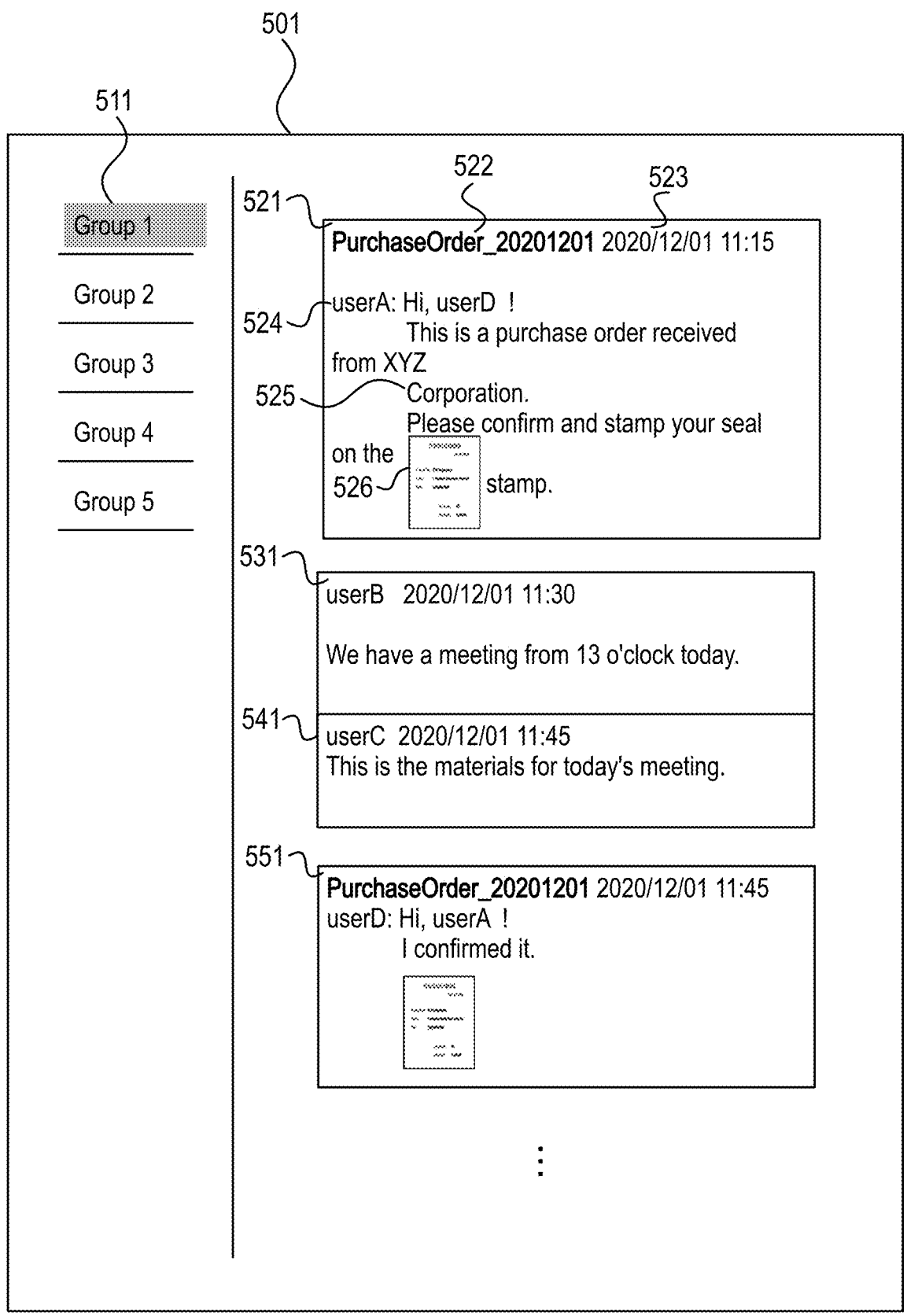
FIG. 5 illustrates a UI of a task application.

FIG. 5 illustrates the exchange of messages between users in the information-sharing service of the task server 131. A screen 501 is a screen of the web UI 363 provided by the task application 361 displayed on the client terminal 121. A group 511 includes users exchanging messages. The users participating in each group can talk with each other. Messages 521, 531, 541, and 551 are listed on the screen 501, and the users can talk with other users by exchanging messages in a tree format like messages 531 and 541. Further, the users can talk in the independent units called threads like messages 521, 531, and 551, and participate in talks that take place in groups and exchange messages on a topic.

The user can set a title of the thread as a subject 522. The user can also set no title for the thread as in the message 531. The message has information including a date and time of posting 523, a user name of posting 524, a posted message 525, and a message attachment file 526.

Figure 6:
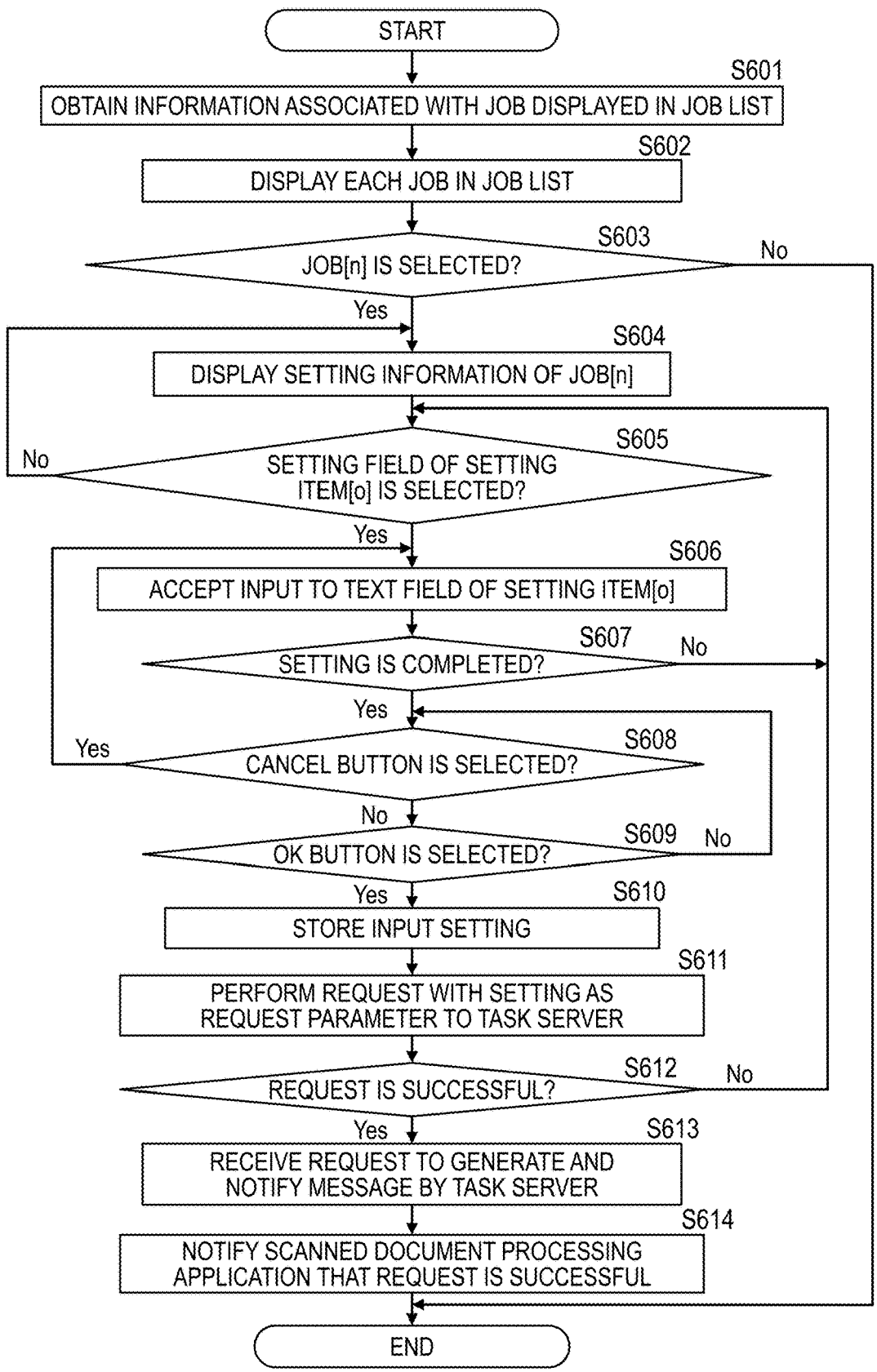
FIG. 6 illustrates a flowchart of transmission procedures from the client application to the task application.

Next, FIG. 6 illustrates the flowchart showing an operation of transmitting a message to the information-sharing service of the task server 131 with the contents set in the client application 351. It is assumed that the task server 131 as a destination and a destination group have already been set at the time of scanning, but it is also possible to display the task server 131 and the destination group in the setting information editing pane 441 of the client application 351 to make the settings. The following processing is realized by executing programs in each of the scanned document processing server 111, the client terminal 121, and the task server 131. The client terminal 121 launches the client application 351 and cooperates with the scanned document processing application 311 to start the following processing.

First, in step S601, the scanned document processing application 311 obtains a processing waiting queue from the scanned document job queue 323. The scanned document processing application 311 obtains an image file from the scanned document storage unit 322 and setting information at the time of scanning, such as a destination, a scan date and time, and a file name, from the setting information management unit 324. The scanned document processing application 311 provides the image file and the setting information to the client application 351.

Subsequently, in step S602, the client application 351 displays each job in the preview pane 411 based on the received information. In step S603, the client application 351 detects that the user has selected a specific job among the displayed jobs. If a specific job is selected (Yes in step S603), the process proceeds to step S604. On the other hand, if the specific job is not selected (No in step S603), the process ends.

In step S604, if the client application 351 detects that the user has selected the specific job, the client application 351 reflects the setting information associated with the selected job on the setting information editing pane 441. If the display of the setting item name has been set on each setting item, the client application 351 sets and displays the value on the editing field (the UI state becomes the UI screen shown in FIG. 4).

In step S605, the client application 351 detects that the user selects an edit field (453, 463 or 473) corresponding to one of setting items (451, 461 and 471). Wherein, in this description, the one setting item corresponding to the selected edit field is described as a setting item[o]. If the client application 351 detects that the user selects the edit field of the setting item[o] (Yes in step S605), the process proceeds to step S606. Otherwise (No in step S605), the process returns to step S604.

In step S606, the user can edit the edit field of the setting item[o], and set an arbitrary value according to an input method and a rule of the edit field. In step S607, the client application 351 confirms whether or not the setting has been completed. If the setting has been completed (Yes in step S607), the process proceeds to step S608. Otherwise (No in step S607), the process returns to step S605.

The following describes processing after editing each setting item. If the client application 351 detects that the user presses the cancel button 482 after the editing for each setting has been completed in step S608 (Yes in step S608), the client application 351 discards the set value instead of saving the set value. Then, the process returns to step S606 and starts over from the state after the setting item[o] is selected. On the other hand, if the client application 351 does not detect that the user presses the cancel button 482 (No in step S608) and presses the OK button 481 (Yes in step S609) after the setting for each setting has been completed, the process proceeds to step S610 to save the setting. On the other hand, if the client application 351 does not detect that the user presses the OK button 481 in step S609 (No in step S609), the process returns to step S608 and waits for the completion of editing and the pressing of the cancel button 482.

To simplify the descriptions, the OK button includes functions for saving the settings and performing transmission simultaneously, but it is also possible to separate the OK button including the function for saving the settings and a transmit button including the function for performing transmission. In step S611, the client application 351 makes a request to the API 362 provided by the information-sharing service, which is the task application 361, using the setting information associated with the job and the value set in each setting item as parameters.

In step S612, the task application 361 determines whether the request has been received successfully. If the request has been received successfully (Yes in step S612), the process proceeds to step S613. Otherwise (No in step S612), the process returns to step S605.

In step S613, the data processing unit 365 of the task application 361 notifies the specific group of the message in a new thread using the parameters received in the request. For example, if a "userD" makes a request to "Group 1" with parameters set as the content of "PurchaseOrder_20201201" for an item of "Subject" and the content of "Hi, userA! I confirmed it" for an item of "Content". In this case, the web UI 363 notifies the message such as the message 551 in FIG. 5.

If the request is received successfully, the task application 361 notifies the scanned document processing server 111 that the request is received successfully in step S614. Furthermore, the task application 361 notifies the client application 351 that the request is received successfully via the API 312 of the scanned document processing server 111, and the client application 351 displays a notification of the success or failure of the request to the user. The notification of success or failure may be made by any means such as a dialog or toast notification on the client application 351, or by email to a predetermined email address. The procedure for setting the scanned document by the user and notifying the message to the task application 361 has been described above.

Next, when the user sets the destination, detailed information (date and time, whether the user is in a group or not) is presented to the user in advance, and the UI of the feature of the present disclosure that enables the user to easily set the destination will be described.

Figure 7:
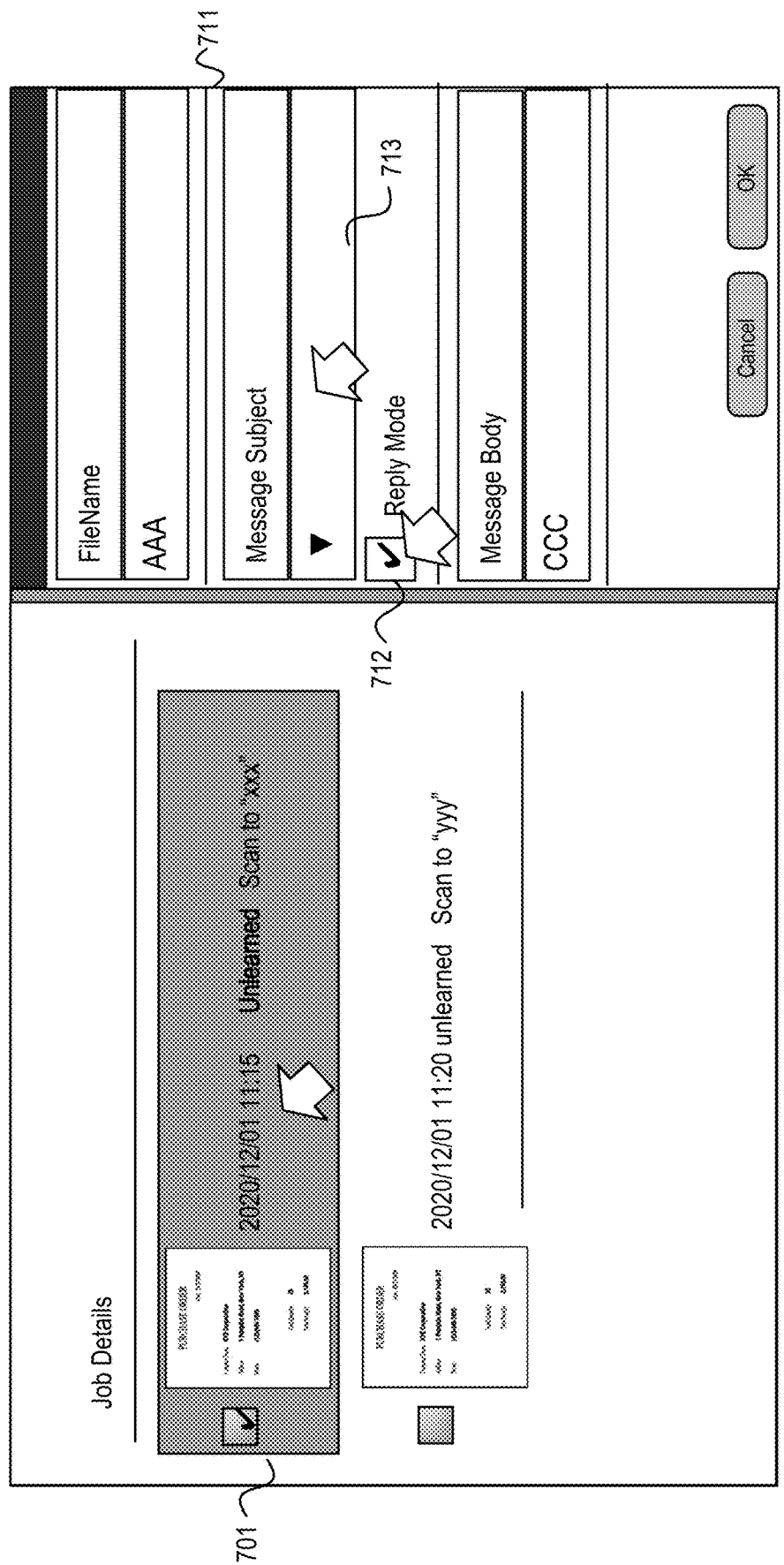
FIG. 7 illustrates an example of the UI of the client application.

FIG. 7 illustrates a diagram showing the operation for switching from the UI in which the user inputs a subject to the UI in which the user specifies the reply destination and makes settings in the present disclosure. A job 701 is selected among the jobs displayed in the job list. A setting item 711 is an item for displaying and setting the subject of the destination thread. A checkbox 712 is used to switch to a mode for replying to a specific thread with a message. The mode is switched if the checkbox 712 is checked. If the checkbox 712 is checked, an edit field 713 is switched to a pulldown list 713.

If the checkbox 712 is checked, the client application 351 executes a request to obtain thread information to the API 362 provided by the task application 361 with the destination group as a parameter. The request is processed by the data processing unit 365 of the task application 361. The client application 351 obtains a list of all threads in the requested group. A list of obtained threads is displayed on the pulldown list 713.

Figure 8A:
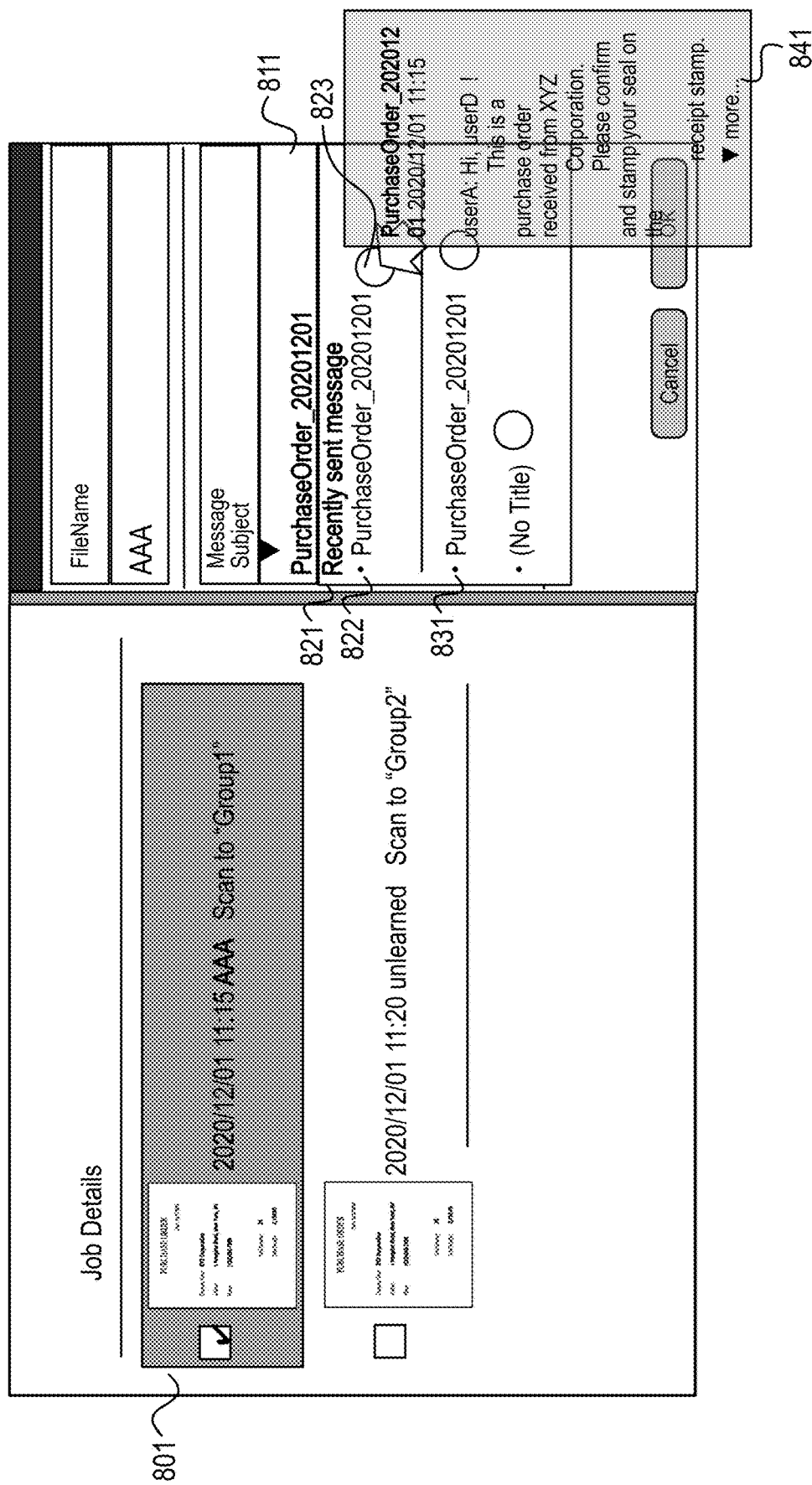
FIG. 8A illustrates an example of the UI of the client application.

FIG. 8A illustrates a diagram showing the presentation and operation of the UI to display the list of threads obtained from the task application 361 in the pulldown list to prioritize the thread that is highly relevant to the user in the present disclosure, and the control to obtain the detailed information of threads. After a job 801 is selected, a list of threads obtained by the client application 351 described with FIG. 7 is displayed in a pulldown list 811.

The pulldown list 811 includes two fields, that is, a field 821 and a field 831. The field 821 preferentially displays the thread including the most recent message received by the user. The field 831 displays a list of threads in a group. The number of threads to be displayed in the fields 821 and 831 may be capped at the time of update, the number of retrievals, or any other method of filtering for data provided by the API. The threads displayed in the field 821 may be displayed in the field 831.

Information 822 for identifying the thread and a control 823 associated with the thread are displayed as information displayed in the pulldown list 811. The information 822 for identifying the thread may be, for example, a thread subject. The information 822 may include a first sentence of a message, a posting user, a date and a time, and an attached filename.

If the client application 351 detects a user operation such as hover or click on the control 823, the client application 351 displays details about the thread within the thread such as thread subject, messages, a date and a time of the thread associated with the control 823. The method of display may be a tooltip 841 (balloon), but the method may be any method such as a dialog 851 as shown in FIG. 8B.

Application Example 1

Extracting Threads Based on Destination Groups

Figure 9:
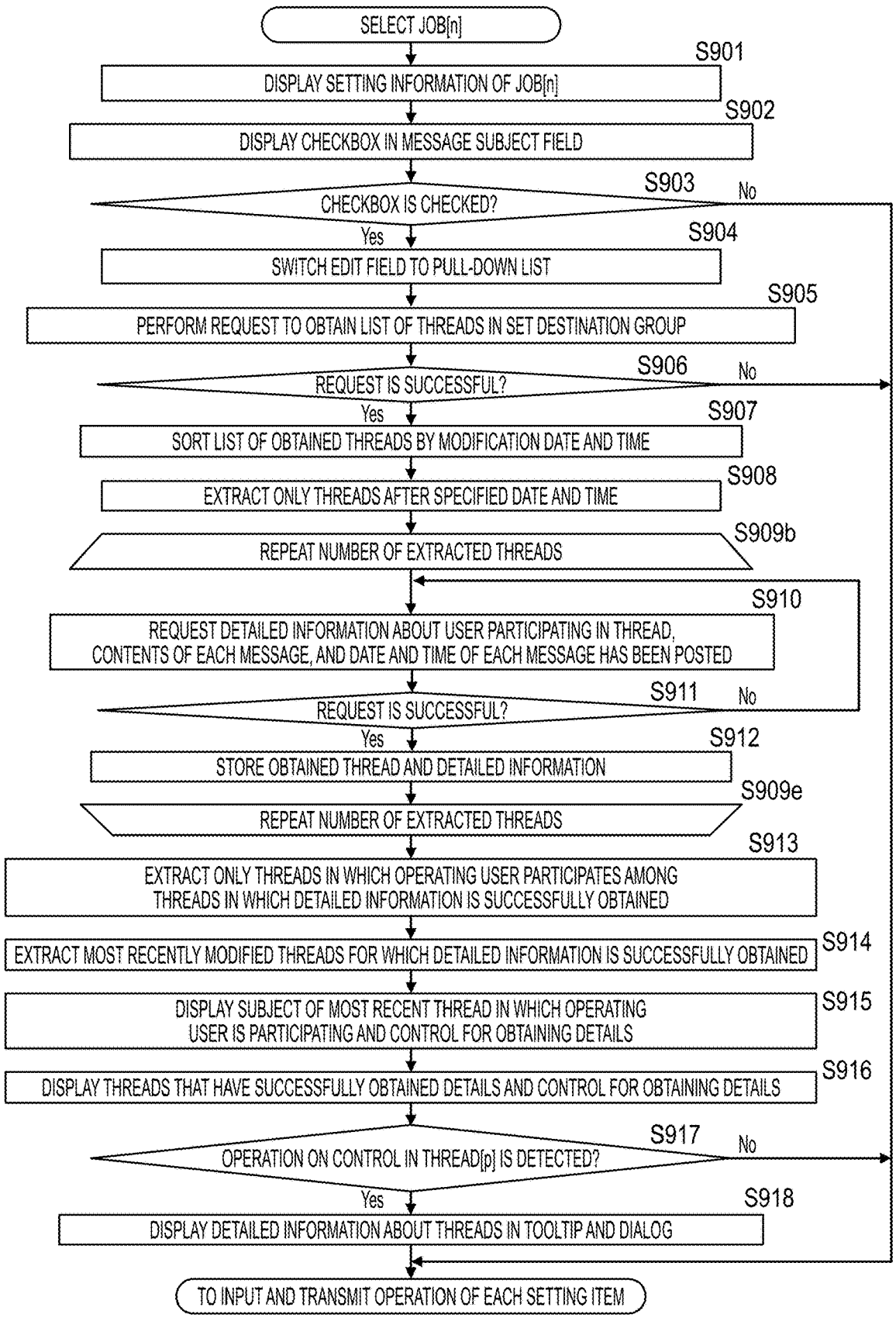
FIG. 9 illustrates a flowchart showing a method of controlling the UI presenting destinations.

FIG. 9 illustrates the flowchart showing an operation to notify a message by specifying a thread as a destination. As in the flowchart in FIG. 6, it is assumed that the task server 131 as a destination and a destination group have already been set at the time of scanning. Further, the task server 131 and the destination group may be displayed on the setting information editing pane 441 of the client application 351 to perform the settings.

If the destination thread is specified, the ID of the destination thread must be passed to the task server 131 as a parameter in step S611 of the flowchart in FIG. 6. Other operations up to selecting the job of the scanned document and after editing the other settings can be described in the same manner as in the flowchart in FIG. 6, so the descriptions of other operations are omitted here.

In step S901, if the client application 351 detects that the user selects a job from the job list displayed in the preview pane 411 in FIG. 4, the client application 351 displays the setting information associated with the selected job in the setting information editing pane 441.

In step S902, the client application 351 displays the checkbox 712 (FIG. 7) for switching to a mode for specifying the thread to be transmitted on the edit item of the setting information of the message subject in the job. If the user wants to transmit the settings to the specific thread, the user checks the checkbox 712 in the "subject" of the setting.

In step S903, if the client application 351 detects that the user checks the checkbox 712 (Yes in step S903), the process proceeds to step S904 and switches the display of the edit field to a pulldown list (step S904). On the other hand, if the client application 351 does not detect that the user checks the checkbox 712 (No in step S903), the process is terminated and the processing of the flowchart in FIG. 6 is performed.

In step S905, the client application 351 requests to obtain the list of threads to the API 362 provided by the task application 361 with the set destination group as a parameter.

In step S906, the task application 361 receives the request to perform processing in the data processing unit 365. Based on the parameters of the destination group received in the request, the task application 361 transmits the list of threads in the group to the client application 351 via the scanned document processing server 111. If the request is not received successfully or the process is not successful (No in step S906), the process is terminated.

Although a timing that the client application 351 requests to obtain the list of the threads may be defined as a timing of checking the checkbox 712, the timing may be defined as a timing of starting the client application 351 or a timing of displaying the job in the preview pane 411. Specifically, the client application may start the requesting to obtain the list of a plurality of jobs in response to starting the client application 351, displaying the job in the preview pane 411, or selecting the job.

If the processing for the request is successful, the client application 351 sorts the obtained threads in the order of update date and time in step S907. In step S908, if the user wants to display threads whose update date and time is after a predetermined date and time in the pulldown list, the threads whose update date and time is after the predetermined date and time are filtered from the sorted threads and displayed in the pulldown list.

In steps S907 and S908, an upper limit may be set on the setting value. Further, the set value for setting the upper limit may be set by any method that filters the number of obtaining threads or other data provided by the API 362. For each of the obtained and filtered threads, the processing of steps S910 to S912 is repeatedly executed (from steps S909b to S909e).

In step S910, the client application 351 requests to obtain properties such as the participating users in the thread, all messages in the thread, and the posting date and time of each message to the API 362 provided by the task application 361. The task application 361 receives the request and performs processing in the data processing unit 365. Based on the parameters of the thread information received in the request, the task application 361 transmits detailed information in the thread to the client application 351 via the scanned document processing server 111.

In step S911, the client application 351 determines whether the request is successful, and if the client application determines that the request is failed (No in step S911), the process returns to step S910 to execute the re-request. The number of re-requests is limited to avoid endless repetition. On the other hand, if the client application determines that the request is successful (Yes in step S911), the process proceeds to step S912. In step S912, the client application 351 associates and stores the thread and detailed information of the thread obtained in the request.

If it is determined in step S909e that the processing of steps S910 to S912 has been executed repeatedly for all filtered threads, the process proceeds to step S913. In step S913, the client application 351 extracts the threads in which the user is participating in among threads obtained successfully.

In step S914, the client application 351 extracts the thread with the latest update date and time. In step S915, the client application 351 preferentially displays the latest thread and the control in which the user is participating in the pulldown list 821. In step S916, the remaining threads or all threads with or without the filtering and the control are displayed in the pulldown list 831. In step S917, the client application 351 detects whether or not the user operates the control. If the client application 351 detects an operation by the user (Yes in step S917), the process proceeds to step S918. Otherwise (No in step S917), the process is terminated.

In step S918, regarding the thread associated with the control to which the user operation is detected, the client application generates a message by using the details of the stored thread to display the message in the tooltip or dialog and the processing is terminated.

The above processing will give priority to new messages with updated dates and times in the groups which a user is participating in. The user can confirm the message in the tooltip to understand what the thread is about, based on the talks, the date and time, and the like, before setting a destination. The user can easily identify which thread the user wants to transmit the message to.

Application Example 2

Extracting Highly Relevant Threads Based on Transmission Histories

Figure 10:
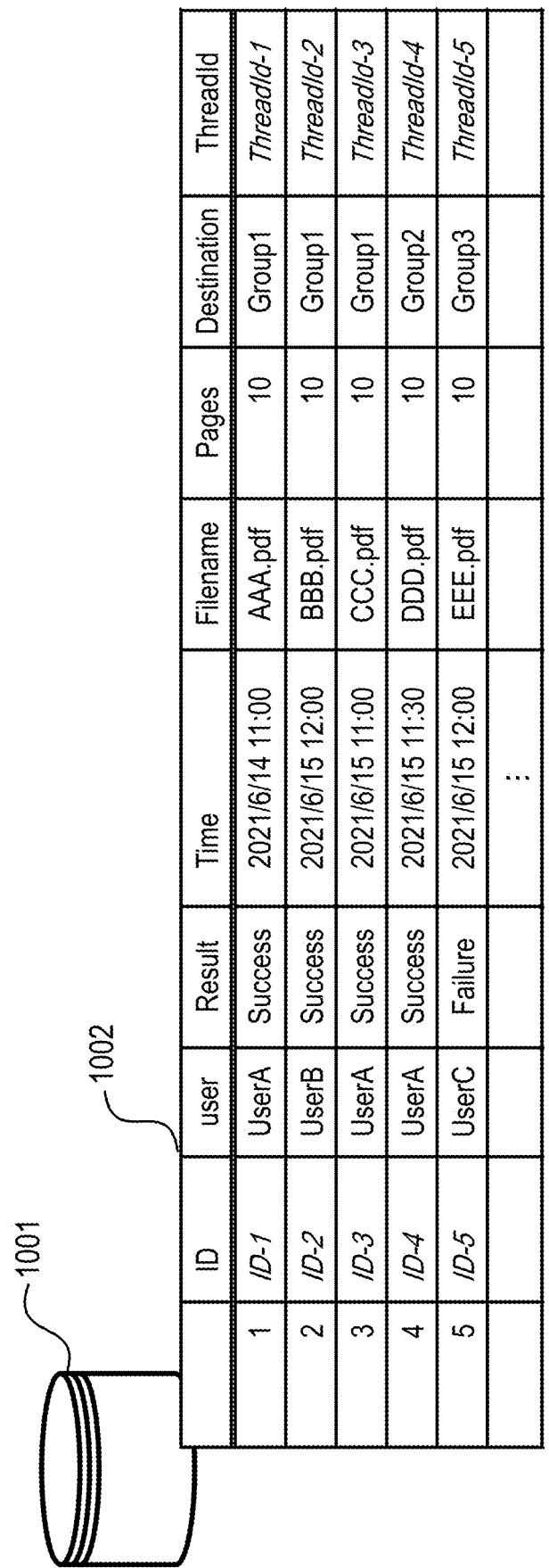
FIG. 10 illustrates histories stored in a scanned document processing server.

Next, regarding displaying threads highly relevant to a user, a method of presenting a destination using histories transmitted via the scanned document processing server 111 will be described below. FIG. 10 illustrates a diagram showing the historical data.

The data store 321 includes a storage area 1001 for storing an operation log by the user. The log may be located on an external server different from the scanned document processing server 111.

A history table 1002 includes the contents of histories in a tabular format. The history table 1002 stores indexes, history IDs, user names, results, transmission date and time, filenames as file information, number of pages, group names of transmission destinations, thread IDs as thread information, and the like. Each history record includes a unique history ID distinguishing the histories from each other. Further, information related to a plurality of task servers 131 may be optionally added to the histories if the configuration is such that the plurality of task servers 131 are used for.

Figure 11:
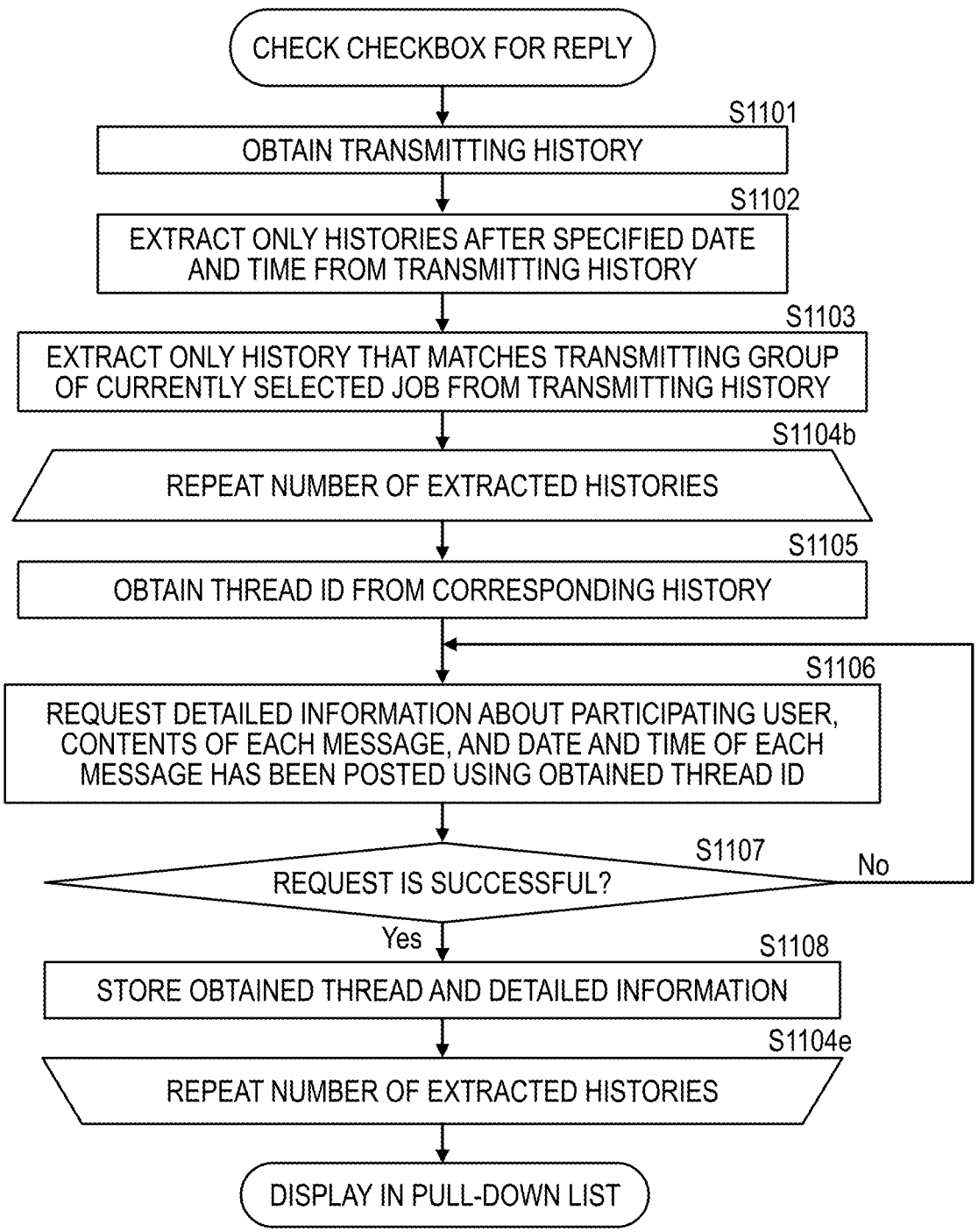
FIG. 11 illustrates a flowchart showing a method of controlling the UI presenting destinations.

FIG. 11 illustrates a flowchart showing a method of determining and presenting the thread to the user based on the histories. After identifying the thread based on the target history and obtaining detailed information, the processes are the same as those described in the flowchart step S912 and later in FIG. 9, so the description thereof is omitted. The processes are performed if the user checks the checkbox 712 for reply.

In step S1101, the client application 351 obtains transmission histories from the storage area 1001. In step S1102, the client application 351 extracts the histories after the specified date and time from the transmission histories. In step S1103, the client application 351 obtains destination groups from the setting information associated with the selected job and extracts histories in which the histories of the destination match the destination groups. For each of the extracted histories, the processing of steps S1105 to S1108 is repeatedly executed (steps S1104b to S1104e).

In step S1105, for each extracted history, the client application 351 obtains a thread ID of the history.

In step S1106, the client application 351 requests the API 362 provided by the task application 361 to obtain detailed information using the obtained group and the obtained thread ID. The task application 361 receives the request and performs processing in the data processing unit 365. Based on the parameters of the thread information received in the request, the task application 361 transmits detailed information of the thread to the client application 351 via the scanned document processing server 111.

In step S1107, the client application 351 determines whether the request is successful. If the client application 351 determines that the request is failed (No in step S1107), the re-requesting process is executed. The number of re-requests is limited to avoid endless repetition.

If the client application 351 determines that the request is successful, the process proceeds to step S1108. In step S1108, the obtained thread and detailed information are associated and stored. If it is determined in step S1104e that the processes in steps S1105 to S1108 have been repeatedly executed as many times as all the extracted histories, the process exits the loop process from step S1104b to step S1104e.

The user can extract messages highly relevant to the user from the threads in which the user is participating in to display the extracted messages in a pulldown list. The stored detailed information is then presented to the user by detecting operations on the controls displayed in the pulldown list.

Based on the above processing, the messages highly relevant to the users among jobs transmitted via a scanned document processing server can be presented for the users.

According to the present disclosure, a thread of a message highly relevant to an operating user is presented from a thread list on an information-sharing service, and further detailed information about each thread is presented to facilitate the user's operation of setting the destination.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-185483, filed Nov. 15, 2021, which is hereby incorporated by reference herein in its entirety.

What is claimed is:

1. An information processing apparatus, comprising:
   a display device;
   at least one memory that stores instructions; and
   at least one processor that executes the instructions to:
   display a setting screen for receiving a user operation related to a subject and a reply mode;
   obtain information on a plurality of threads from an information-sharing service in a case where the reply mode is set on the setting screen, wherein the information-sharing service manages messages on a thread format including a plurality of messages;
   extract information corresponding to first threads relevant to the user from the obtained information on the plurality of threads;
   display the extracted information corresponding to the first threads on a subject field of the setting screen;
   receive a user specification of a thread from the displayed information on the subject field, so the message is managed as a reply to the user specified thread by the information-sharing service; and
   transmit, to the information-sharing service, a message to which the user specified thread is set as the subject with a scanned document.

2. The information processing apparatus according to claim 1, wherein the information corresponding to the first threads are extracted from the obtained information on the plurality of threads by filtering threads whose update date and time are after a predetermined date and time.

3. The information processing apparatus according to claim 2, wherein the information corresponding to the first threads are extracted from the obtained information on the plurality of threads which are sorted in an order of update date and time.

4. The information processing apparatus according to claim 1, wherein the at least one processor executes the instructions to further display detailed information of one thread selected from the first threads by the user in response to selecting the one thread from the displayed information corresponding to the first threads by the user.

5. The information processing apparatus according to claim 4, wherein the detailed information is displayed on a tooltip or a dialog.

6. The information processing apparatus according to claim 1, wherein the information corresponding to the first threads are displayed on a pulldown list.

7. A non-transitory computer-readable storage medium that stores a program to cause a computer of an information processing apparatus to perform:
   displaying a setting screen for receiving a user operation related to a subject and a reply mode;
   obtaining information on a plurality of threads from an information-sharing service in a case where the reply mode is set on the setting screen displayed on a display device of the information processing apparatus, wherein the information-sharing service manages messages on a thread format including a plurality of messages;
   extracting information corresponding to first threads relevant to the user from the obtained information on the plurality of threads;
   displaying the extracted information corresponding to the first threads on a subject field of the setting screen;
   receiving a user specification of a thread from the displayed information on the subject field, so that the message is managed as a reply to the user specified thread by the information-sharing service; and
   transmit, to the information-sharing service, a message to which the user specified thread is set as the subject with a scanned document.

* * * * *